(12) United States Patent
Frey et al.

(10) Patent No.: US 6,393,343 B1
(45) Date of Patent: May 21, 2002

(54) PASSENGER SERVICE UNIT AND AN AIRCRAFT CABIN SYSTEMS CONTROL WITH SUCH SERVICE UNITS

(75) Inventors: Martin Frey, Buchholz; Dirk Andersen, Wilster, both of (DE)

(73) Assignee: Airbus Deutschland GmbH, Hamburg (DE)

(*) Notice: Subject to any disclaimer, the term of this patent is extended or adjusted under 35 U.S.C. 154(b) by 0 days.

(21) Appl. No.: 09/651,711

(22) Filed: Aug. 31, 2000

Related U.S. Application Data

(63) Continuation-in-part of application No. 09/041,407, filed on Mar. 12, 1998, now abandoned.

(30) Foreign Application Priority Data

Mar. 13, 1997 (DE) .......................................... 197 10 286

(51) Int. Cl.[7] .............................................. G06F 19/00
(52) U.S. Cl. ........................................ 701/3; 244/75 R
(58) Field of Search ............................ 701/3, 4, 14, 48; 340/945, 971; 244/75 R, 76 R, 175

(56) References Cited

U.S. PATENT DOCUMENTS

| | | |
|---|---|---|
| 4,658,359 A | 4/1987 | Palatucci et al. |
| 4,774,514 A | 9/1988 | Hildebrandt et al. |
| 4,849,893 A | 7/1989 | Page et al. |
| 4,943,919 A | 7/1990 | Aslin et al. |
| 5,369,584 A | 11/1994 | Kajiwara |
| 5,386,363 A | 1/1995 | Haak et al. |
| 5,778,203 A | 7/1998 | Birkedahl et al. |
| 6,122,572 A * | 9/2000 | Yavnai .......................... 701/3 |

* cited by examiner

Primary Examiner—Gary Chin
(74) Attorney, Agent, or Firm—W. F. Fasse; W. G. Fasse

(57) ABSTRACT

Passenger service units in an aircraft are equipped with a passenger interface and supply adapter (10). Each adapter includes an individual processor (14) which is programmable independently of the aircraft central control through a programming input. The programmable interface (10) permits controlling passenger service components in the passenger cabin such as lamps in a cabin lighting system, a public address system, and so forth, directly by the interface (10) independently of the aircraft central control. The interface (10) with its own individual processor (14) and memory (15) is connected through a databus (11) to the aircraft central control (12), for example, for remote programming of the interface and for reporting the module's activities to the aircraft central control. The interface (10) reduces the memory capacity requirements for the aircraft central control and permits the individual programming of each passenger service unit also independently of any other passenger service unit thereby avoiding retesting of the entire cabin system when for example only one passenger service unit is reprogrammed.

12 Claims, 3 Drawing Sheets

US 6,393,343 B1

PASSENGER SERVICE UNIT AND AN AIRCRAFT CABIN SYSTEMS CONTROL WITH SUCH SERVICE UNITS

CROSS-REFERENCE TO RELATED APPLICATION

The present application is a Continuation-In-Part application of our application U.S. Ser. No. 09/041,407, filed on Mar. 12, 1998 for "AIRCRAFT CABIN SYSTEMS CONTROL" now abandoned.

PRIORITY CLAIM

This application is based on and claims the priority under 35 U.S.C.§120 of U.S. Ser. No. 09/041,407, filed Mar. 8, 1998 now abandoned, which in turn is based under 35 U.S.C.§119 on German Patent Application 197 10 286.7, filed on Mar. 13, 1997.

FIELD OF THE INVENTION

The invention relates to a passenger service unit for aircraft cabin systems. The passenger service units are connected through data buses to an aircraft central control for controlling and monitoring cabin lighting systems, a cabin public address system, displays, keyboards, sensors such as temperature sensors and air circulation sensors timers, counters, switches, and the like referred to herein as passenger service units and components of such passenger service units.

BACKGROUND INFORMATION

It is known to organize the open and closed loop controlling and monitoring of aircraft cabin systems electrically and electronically with the aid of an aircraft central control. The aircraft central control comprises one or two computers which control all individual passenger service units and/or components of the above mentioned cabin systems. The individual components such as lights, loudspeakers, temperature sensors, and the like, are connected to the computer or computers through data buses and the individual components do not contain any "intelligence" of their own. The components receive their instructions through the data buses and are capable of returning certain response signals to the central control. Such response signals, for example provide information whether the particular component is in the on or off state or whether it is functioning properly.

The just described conventional control system has certain drawbacks. For example, one such drawback is seen in that a multitude of conductors must be installed in the aircraft to form the data buses. The nature of such conductors makes the cabin layout rather unflexible with regard to increasing the system size, adding to the system functions, or modifying the system for example when changing a cabin layout to another cabin layout.

Another disadvantage of conventional systems is in the fact that the more complex a conventional system gets, the higher are the costs for performing testing operations that are required in order to obtain official licenses for the use of such systems. Moreover, changes made in a single passenger service unit or component conventionally require retesting the entire cabin system for official approval. Similarly, any change or addition to the central aircraft control for varying a capability or for adding capabilities also requires renewed testing of the entire system on the assumption that such changes or additions may have adversely affected the entire system, for example with regard to the system reliability. In other words, all components of a conventional system must be retested even if only one component was modified. Such requirements are officially imposed because it must be proven by the operator of the system that components which have not been modified by the addition of a new capability or several new capabilities, have not been affected by such addition or additions, or modifications. A new license is then issued only after the renewed proof has been provided to the licensing authority.

U.S. Pat. No. 5,369,584 (Kajiwara) discloses a control system for a vehicle with a central controller (30) connected through a data bus (34) to submain controllers (35, 36). One submain controller (35) is a power controller for operating the engine and the transmission directly in response to signals from engine sensors (13) and signals from transmission sensors (14) independently of the central controller. The other submain controller (36) is a drive controller and can respond to signals from a steering sensor (40), from a suspension sensor (15) and from a brake sensor (16), also independently of the central controller. The central controller (30) overrides the submain controller in response to certain sensor signals such as distance signals to a preceding vehicle measured by a sensor (31) directly connected to the central controller (30). The submain controllers do not have any programming capability that is independent of the main control.

The vehicle control system of Kajiwara is not suitable for use in a passenger aircraft cabin system because the system does not have to meet official aircraft safety standards, the known system does not provide personal/computer facilities to the passengers of the vehicle, and the power and drive controller (35, 36) cannot be programmed, much less reprogrammed.

U.S. Pat. No. 4,774,514 (Hildebrandt et al.) describes a method and system for carrying out passenger-related and flight attendant-related functions in a passenger aircraft. The main purpose of the Hildebrandt et al. invention is to use permanently installed wiring in an aircraft cabin for several different cabin layouts by providing a decoder/encoder unit (DEU) between a central data bus that leads to the aircraft central control computer and individual passenger service unit. Due to the decoder/encoder units the Hildebrandt et al. system is very flexible in its ability for changing a cabin layout. However, the economy and weight of the permanent wiring leaves room for improvement. The Hildebrandt et al. system still requires a substantial number of individual conductor wires, a passenger service unit, also referred to as passenger supply and information unit, and the respective decoder/encoder unit. More specifically, up to seventeen conductor wires each with an average length of about 3.8 meters may be required between a decoding/encoding unit and the respective passenger service unit. Assuming that there are on average about 150 passenger service units in a passenger aircraft, substantial reductions in wiring requirements would be very desirable.

OBJECTS OF THE INVENTION

In view of the foregoing it is the aim of the invention to achieve the following objects singly or in combination:

to provide a passenger service unit for an aircraft with a passenger interface and supply adapter which is individually programmable and can function independently of any aircraft central control;

reprogram the same passenger interface and supply adapter for different purposes and different functions;

to relieve or reduce the operations and/or storage capabilities of the central computer of the aircraft central control;

to reduce the number of electrical conductors for transmitting signals between the above-mentioned decoder/encoder unit and the respective individual passenger service unit for achieving a respective weight reduction and a reduced effort and expense for the wiring installation; and to construct the passenger interface and supply adapter in such a way that it functions as a buffer or interface between the aircraft central control and any other passenger service unit, whereby modifications of any passenger service unit or component such as reprogramming its interface and supply adapter will not affect any other passenger service unit or component, whereby retesting of the entire system is avoided when system changes or system expansions are made and only the changed passenger service units or added passenger service units need to be tested.

SUMMARY OF THE INVENTION

The above objects have been achieved according to the invention by a passenger service unit (PSU) for an aircraft cabin, said passenger service unit comprising at least one passenger service component, a passenger interface and supply adapter (PISA) (10) for controlling said at least one passenger service component independently of an aircraft central control (12), said passenger interface and supply adapter (10) comprising at least one programming input/output (17) for programming or reprogramming said passenger service unit independently of said aircraft central control (12), a signal conductor bus (11) for connecting said passenger interface and supply adapter (10) to said aircraft central control (12), said passenger interface and supply adapter (10) further including a processing unit (14) connected to said programming input/output (17) for individually programming said processing unit (14) and thereby controlling said at least one passenger service component in said passenger service unit independently of said aircraft central control (12), said passenger interface and supply adapter (10) further comprising a memory (15) operatively connected to said programming input/output (17) for program storing, wherein said passenger interface and supply adapter (10) functions as a buffer between said aircraft central control (12) and said passenger service unit, so that said passenger service unit is modifiable by individual programming without affecting any other passenger service unit or units.

Such a separate passenger interface and supply adapter is also referred to herein as a multi-purpose module (10) capable of operating independently of the central control and thereby relieving the central control by controlling and/or monitoring certain functions, particularly passenger related functions and flight attendant related functions in a decentralized manner so that the central aircraft control remains unaffected by the decentralized operations, whereby the costs for testing to obtain the required official licenses have been substantially reduced because retesting of the central control and the entire system is avoided and only the multi-purpose module needs to be retested if and when it has ben reprogrammed.

Another advantage of the invention is seen in that the control of a cabin system or systems through a plurality of multi-purpose modules (10) is rather flexible, particularly with regard to changes and expansions in the system functions that can be performed by the multi-purpose module or modules. Open and closed loop control functions, as well as monitoring can be efficiently integrated into such a multi-purpose module.

Moreover, the multi-purpose module has a so-called "stand alone" capability so that individual components of any cabin system can be controlled and monitored by the module to keep these components operable independently of any other passenger service units or components. This feature of the module is particularly useful in connection with old control programs because existing cabin systems can be retrofitted in a simple manner with one or several multi-purpose modules. The programming and testing of such retrofitted multi-purpose module or modules can be performed independently of the aircraft central control and is therefore substantially less expensive. It is also an advantage that such modules have a very small space requirement for their installation with the added bonus of requiring but a small power consumption for operating the module. Where certain components such as lamps or other power consuming components are operated through the multi-purpose module, it is preferred that module controlled driver stages or power amplifiers are provided in the power supply circuit for the respective component or components.

It is also preferred that the multi-purpose module is equipped with its own power supply unit, and that at least one voltage supply for other components is provided by the module, especially a controlled voltage.

According to the invention there is further provided a passenger service system in an aircraft cabin, said system comprising a plurality of passenger service units (4), an aircraft central control (12) for centrally controlling said passenger service units (4), each passenger service unit comprising at least one passenger service component and a passenger interface and supply adapter (PISA, 10) for controlling said at least one passenger service component in said aircraft cabin independently of said aircraft central control (12), said passenger interface and supply adapter 10) comprising at least one programming input/output (17) for programming said passenger service unit independently of said aircraft central control (12), a signal conductor bus (11) for connecting said passenger interface and supply adapter (10) through said signal conductor bus (11) to said aircraft central control (12), said passenger interface and supply adapter (10) further including a processing unit (14) connected to said programming input/output (17) for individually programming or reprogramming said processing unit (14) and thereby controlling said at least one passenger service component independently of said aircraft central control (12), said passenger interface and supply adapter (10) further comprising a memory (15) operatively connected to said programmable input/output (17) for program storing, wherein said passenger interface and supply adapter (10) functions as a buffer between said aircraft central control (12) and said passenger service units, so that any one of said passenger service units is modifiable by individual programming without affecting any other passenger service unit or units.

The above outlined advantages of the invention are equally achieved by the present passenger service system.

In both embodiments of the invention the present passenger interface and supply adapter or multi-purpose module (10) is preferably hermetically sealed in its installation housing so that it is not sensitive against external mechanical influences.

Moreover, it is advantageous to reduce even the small power consumption of the multi-purpose module by providing it with a so-called standby mode of operation, which can, for example be achieved by a respective programming of the individual CPU of the module which switches the module into a standby mode if the module has been inactive for a defined time period.

In a preferred embodiment the module is equipped with a freely programmable input/output unit (I/O) for supplying, for example, discrete analog and digital data to the module. Moreover, the multi-purpose module is equipped with a memory for storing one or more programs such as control programs that are permanently stored in the memory, whereby the memory size of the aircraft central control can be reduced or supplemented. The databus between the module and the central control permits, for example, a remote programming of the module through the central control in addition to the individual programming of the module independently of any programing through the central control. These features of the invention substantially reduce the wiring requirements between the module and the individual passenger service components as compared to systems without such modules.

BRIEF DESCRIPTION OF THE DRAWINGS

In order that the invention may be clearly understood, it will now be described, by way of example, with reference to the accompanying drawings, wherein.

DETAILED DESCRIPTION OF A PREFERRED EXAMPLE EMBODIMENT AND OF THE BEST MODE OF THE INVENTION

The expression "passenger service component" as used herein is intended to cover any element or combination of elements that are provided in an aircraft passenger cabin system for the benefit of the passengers regardless whether these passenger service components are used by the passenger directly or by a crew member. Similarly, the term "passenger service units" (PSU) is intended to include all units provided in the passenger cabin system for the benefit of the passengers. A passenger service unit (PSU) includes at least one passenger service component, normally several such components are included in a PSU. These components include for example loudspeaker system components; passenger call system components; indicator signal components; cabin lighting components; passenger oxygen supply components; reading light system components; flight attendant on-board communication system components; flight attendant call system components; evacuation signal providing components; cabin warning and indication system components; cabin management, system components; passenger entertainment system components; passenger terminal system components; and passenger monitoring system components.

Figure 1:
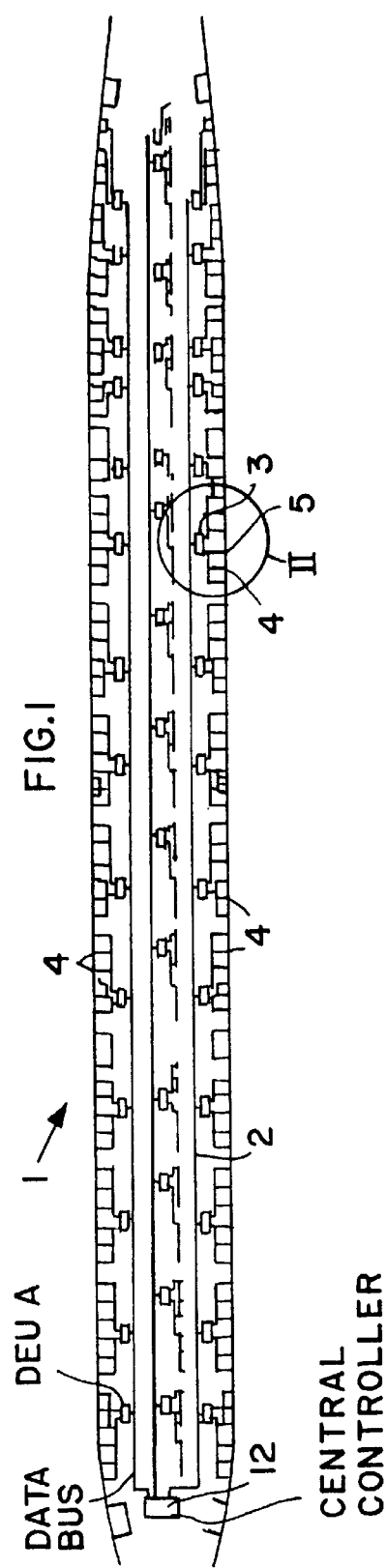
FIG. 1 is a schematic illustration of the distribution of passenger service units according to the invention in an aircraft cabin.

FIG. 1 shows a simplified layout of passenger service units 4 in an aircraft passenger cabin 1. One or more groups of such passenger service units 4 are connected through signal conductor or data buses 5 to decoder/encoder units 3. The decoder/encoder units 3 are connected to an aircraft central control 12 through a data bus or signal conductor 2 which is a high speed data bus for the digital transmission of data from the aircraft central control 12 to the individual decoder/encoder units 3 which are described in more detail in the above-mentioned U.S. Pat. No. 4,774,514 (Hildebrandt et al.).

Figure 2:
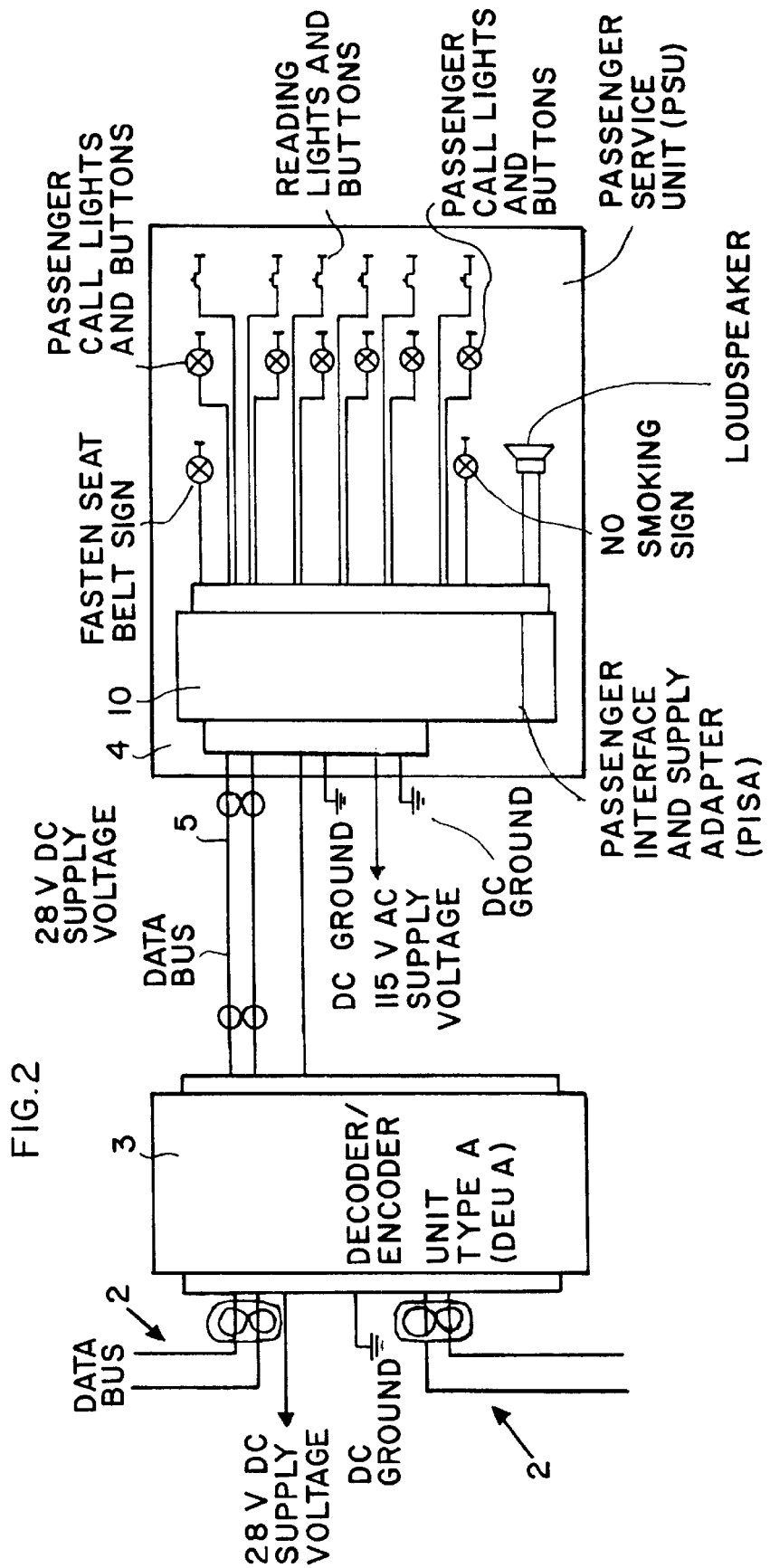
FIG. 2 is a block diagram of a passenger service unit of the invention connected through a decoder/encoder unit to an aircraft central control.

FIG. 2 illustrates on an enlarged scale the content of the circle II in FIG. 1 although only one passenger service unit 4 is shown in FIG. 2 rather than six symbolically indicated as dots in FIG. 2. According to the invention, each passenger service unit 4 is equipped with its own passenger interface and supply adapter 10 the content of which is shown in more detail in FIG. 3 to be described below. The passenger interface and supply adapter 10 referred to herein simply as multi-purpose module 10, is connected with its input through the data bus 5 to the output of the decoder/encoder 3 while the outputs of the nodule 10 are connected to individual passenger service components such as a "fasten seat belt" sign a "no smoking" sign, a loudspeaker, and several call lights, for example for a row of passenger seats, equipped with call buttons operable by a passenger.

The passenger service units 4 are allocated to various areas within the cabin. For example, each seat or column of seats may have its own passenger service unit 4. This applies equally to certain service areas, such as galleys, toilet areas and common areas accessible by all passengers. These units are operable by a passenger or by a crew member, such as a flight attendant. The distribution of the passenger service units 4 in the cabin is illustrated in FIG. 1.

The module 10 is freely programmable and reprogrammable and includes software downloading capabilities. Further, the module 10 can perform functions completely independently of the central control 12. Thus, a high flexibility for the reallocation of cabin space to different classes is readily possible while simultaneously reducing the number of conductor wires leading to a beneficial weight reduction and savings in installation costs, while simultaneously reducing requirements to be met by the aircraft central control.

Figure 3:
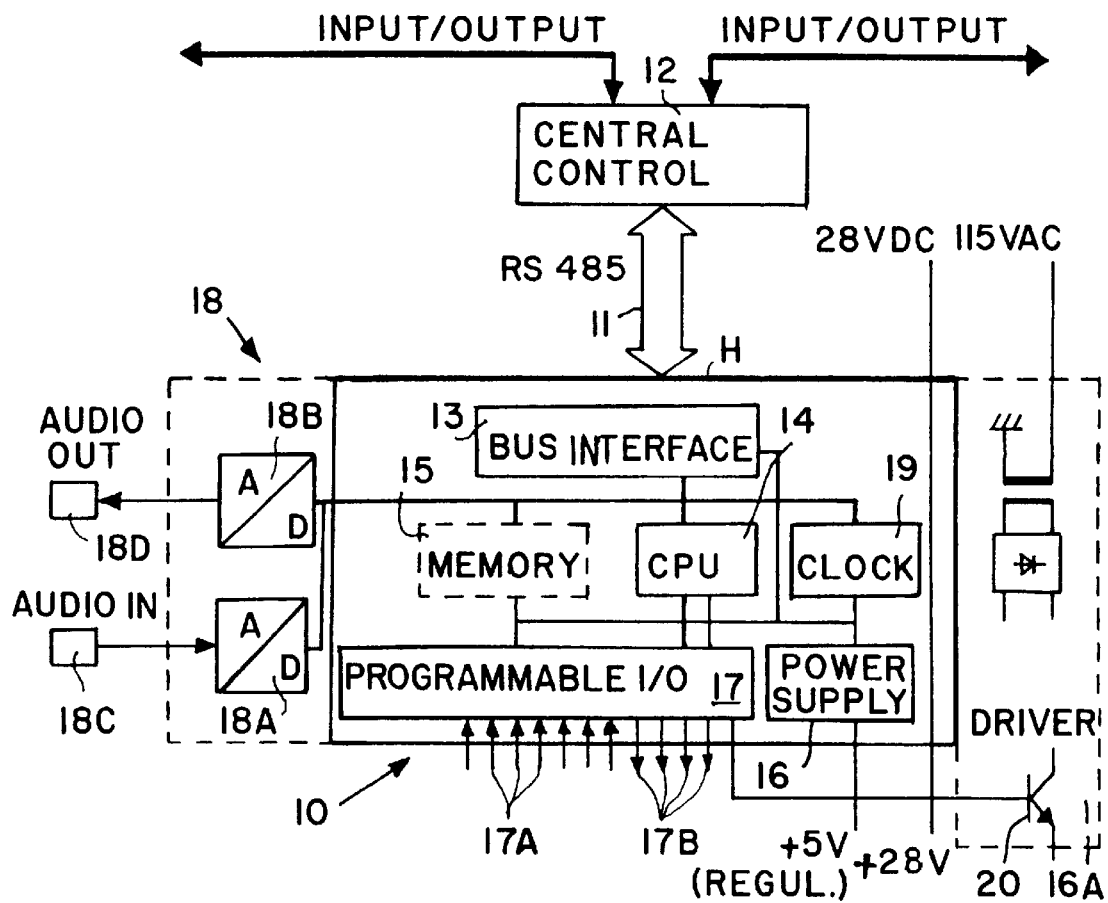
FIG. 3 is a block diagram of the present multi-purpose module connected through a databus to the aircraft central control.

FIG. 3 shows that the multi-purpose module 10 is connected through a data and signal high speed digital bus 11 directly to the aircraft central control 12 rather than through a decoder/encoder unit 3 as shown in FIG. 2. Both versions are practical for various purposes. The module 10 serves for controlling components in cabin systems such as lamps, loudspeakers, displays, keyboards, sensors such as temperature sensors, switches, timers, counters, and so forth. These components are connected to an input/output unit, of the module 10. For example, a public address system is connected to an audio input/output 18 including an analog-to-digital converter 18A forming an input that is connected, for example, to a microphone 18C. A further digital-to-analog converter 18B is connected to an audio output such as a loudspeaker 18D.

The module 10 comprises a bus interface 13, its own processing unit 14 independently of the aircraft central control, a memory 15 and a power supply 16. The power supply 16 is connected to a conventional d.c. voltage supply of 28 V provided by the onboard aircraft power supply network. If necessary, the individual power supply for the module 10 may also be connected to the onboard alternating network of 115 V a.c. The power supply 16 provides a 5 V d.c. output voltage which is controlled in a closed loop manner and it may also provide a non-controlled 28 V d.c. output.

The module 10 further comprises a programmable input/output unit 17 with input/output terminals 17A and 17B, respectively, for example in the form of a keyboard KB shown in FIG. 2. The output terminals 17B are connected to the system components to be controlled by the nodule 10 preferably through driver circuits 20 where necessary. Such driver circuits are, for example used for operating lamps of a cabin lighting system. Moreover, the module 10 includes a clock signal generator 19 for control and monitoring purposes.

The present module 10 functions as an auxiliary to the aircraft central control 12 and is capable of operating cabin systems without connection to the central aircraft control 12. However, the databus 11 is provided so that the module 10 can communicate with the central control 12 through the bus 11 and the bus interface 13. This feature makes it possible to control the module by the central control 12 and if necessary remote programming of the module 10 may be performed through the central control 12. For each intended cabin systems control application a respective program or several programs can be stored in the memory 15 and such programs are either fixed in the memory 15 even before installation of the module 10 or after its installation. Both types of stored programs may be combined so that the memory 15 may have certain programs already stored while additional programs are then entered after installation. The module 10 is preferably programmed in such a way that in its standby mode its power consumption is reduced, whereby a standby mode will automatically kick in following a certain time duration of inactivity of the multi-purpose module 10.

The present module 10 is, as mentioned above, programmed for its intended use, whereby one or more programs may be employed for each possible application. In other words, one or more programs may be provided for each of the cabin systems to be controlled. For example, the input/output unit 17 is so programmable that discrete values as well as analog and digital input/output signals can be processed. Further, with the aid of the bus. 11 and the bus interface 13 the module 10 can inform the central control 12 which particular cabin system components are being controlled and what external inputs have been provided so that the central control knows what functions it does not have to perform anymore because they are performed by the module 10, whereby the latter substantially relieves the data banks that are part of the central control.

Further, the module 10 can have data stored therein which are then usable for evaluating and control purposes. These data may then be read out in a test bench for built-in test equipment, for analysis, parameter monitoring and so forth. Such parameters may, for example, involve measured cabin temperatures, information provided by air quality sensors and so forth. Certain modules may even have personal computer capabilities.

If the multi-purpose module 10 is provided with a programming tool, it can be adapted to specific individual purposes even directly in the aircraft. The module should preferably be installed in a hermetically sealed and screened housing H since no external cooling is necessary. This feature not only makes the module 10 resistant to adverse external influences, it also permits meeting or satisfying the licensing regulations. Further, the sealed installation assures a reliable operation of the module even under high mechanical adverse operating conditions.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A passenger service unit (PSU) for an aircraft cabin, said passenger service unit comprising at least one passenger service component, a passenger interface and supply adapter (PISA) (10) for controlling said at least one passenger service component independently of an aircraft central control (12), said passenger interface and supply adapter (10) comprising at least one programming input/output (17) for programming said passenger service unit independently of said aircraft central control (12), a signal conductor bus (11) for connecting said passenger interface and supply adapter (10) to said aircraft central control (12), said passenger interface and supply adapter (10) further including a processing unit (14) connected to said programming input/output (17) for individually programming said processing unit (14) and thereby controlling said at least one passenger service component in said passenger service unit independently of said aircraft central control (12), said passenger interface and supply adapter (10) further comprising a memory (15) operatively connected to said programming input/output (17) for program storing, wherein said passenger interface and supply adapter (10) functions as a buffer between said aircraft central control (12) and said passenger service unit, so that said passenger service unit is modifiable by individual programming through said programming input/output without affecting any other passenger service unit or units.

2. The passenger service unit of claim 1, wherein said at least one passenger service component which is controllable by said passenger interface and supply adapter (10) is selected from lamps, displays, keyboards, sensors, switches, timers, counters, audio communications components including loudspeakers, passenger call devices, indicators, cabin lighting components, oxygen supply components, reading light components, emergency signal components, warming devices, passenger entertainment components, passenger terminals including keyboards, monitoring components, and cabin management components.

3. The passenger service unit of claim 1, wherein said memory (15) is remote controllable by said central control (12) through said signal conductor bus (11).

4. The passenger service unit of claim 1, further comprising at least one driver circuit (20) for providing power required by said at least one passenger service component.

5. The passenger service unit of claim 4, wherein said at least one driver circuit (20) comprises at least one voltage output for said at least one passenger service component.

6. The passenger service unit of claim 1, wherein said passenger interface and supply adapter (10) comprises its own power supply (16).

7. The passenger service unit of claim 1, further comprising a hermetically sealed housing (H) in which said passenger interface and supply adapter (10) is housed.

8. The passenger service unit of claim 1, wherein said passenger service and supply adapter (10) comprises a standby mode for reducing power consumption.

9. The passenger service unit of claim 1, wherein said at least one passenger service component of said passenger service unit comprises an audio stage (18) including at least one of an input analog-to-digital converter (18A) and an output digital-to-analog converter (18B).

10. The passenger service unit of claim 9, wherein said audio stage comprises an audio input (18C) connected through said analog to digital converter (18A) to an audio input of said passenger interface and supply adapter (10), an audio output (18D) connected through said digital to analog converter (18B) to said passenger interface and adapter (10).

11. A passenger service system in an aircraft cabin, said system comprising a plurality of passenger service units (4), an aircraft central control (12) for centrally controlling said passenger service units (4), each passenger service unit comprising at least one passenger service component and a passenger interface and supply adapter (PISA, 10) for controlling said at least one passenger service component in said aircraft cabin independently of said aircraft central control (12), said passenger interface and supply adapter (10) comprising at least one programming input/output (17) for programming said passenger service unit independently of said aircraft central control (12), a signal conductor bus (11) for connecting said passenger interface and supply adapter (10) through said signal conductor bus (11) to said aircraft central control (12), said passenger interface and supply adapter (10) further including a processing unit (14) connected to said programming input/output (17) for independent programming of said processing unit (14) and thereby controlling said at least one passenger service component independently of said aircraft central control (12), said passenger interface and supply adapter (10) further comprising a memory (15) operatively connected to said programmable input/output (17) for program storing, wherein said passenger interface and supply adapter (10) functions as a buffer between said aircraft central control (12) and said plurality of passenger service units (4), so that any passenger service unit is modifiable by individual programming without affecting any other passenger service unit or units.

12. The passenger service system of claim 11, further comprising a decoder/encoder unit operatively interposed between said signal conductor bus (11) and at least one of said plurality of passenger service units (4).

* * * * *

UNITED STATES PATENT AND TRADEMARK OFFICE
CERTIFICATE OF CORRECTION

PATENT NO.    : 6,393,343 B1  
DATED         : May 21, 2002  
INVENTOR(S)   : Frey et al.

It is certified that error appears in the above-identified patent and that said Letters Patent is hereby corrected as shown below:

Column 1,
Line 15, after "filed", replace "Mar. 8," by -- Mar. 12, --.

Column 2,
Line 63, before "reprogram", insert -- to --.

Column 6,
Line 15, before "10", replace "nodule" by -- module --.

Signed and Sealed this

Eighth Day of October, 2002

Attest:

Attesting Officer

JAMES E. ROGAN  
*Director of the United States Patent and Trademark Office*